(12) United States Patent
Passmore et al.

(10) Patent No.: US 9,454,010 B1
(45) Date of Patent: Sep. 27, 2016

(54) WIDE FIELD-OF-VIEW HEAD MOUNTED DISPLAY SYSTEM

(71) Applicant: Ariadne's Thread (USA), Inc., Solana Beach, CA (US)

(72) Inventors: Charles Gregory Passmore, Austin, TX (US); Adam Li, Solana Beach, CA (US)

(73) Assignee: Ariadne's Thread (USA), Inc., Solana Beach, CA (US)

( * ) Notice: Subject to any disclaimer, the term of this patent is extended or adjusted under 35 U.S.C. 154(b) by 0 days.

(21) Appl. No.: 14/820,774

(22) Filed: Aug. 7, 2015

(51) Int. Cl.
| | | |
|---|---|---|
| *G02B 27/14* | (2006.01) | |
| *G02B 27/10* | (2006.01) | |
| *G09G 5/00* | (2006.01) | |
| *G02F 1/1335* | (2006.01) | |
| *H04N 7/00* | (2011.01) | |
| *A61B 3/10* | (2006.01) | |
| *G02B 27/01* | (2006.01) | |

(52) U.S. Cl.
CPC ... *G02B 27/0172* (2013.01); *G02B 2027/0123* (2013.01)

(58) Field of Classification Search
CPC .......... G02B 27/0172; G02B 27/0149; G02B 27/145; G02B 27/143; G02B 27/0025; G02B 27/0103; G02B 27/144; G02B 27/013; G02B 23/02; G02B 23/18; G02B 5/045; G02B 17/08
USPC ................ 359/630–639, 404, 407, 409–410, 359/618–619, 625, 13–14, 727, 732; 345/7, 345/9; 349/11; 631/633, 640; 353/11–12, 353/28, 119; 348/115; 351/41–158, 351/205–206, 210, 221
See application file for complete search history.

(56) References Cited

U.S. PATENT DOCUMENTS

| | | |
|---|---|---|
| 5,841,439 A | 11/1998 | Pose et al. |
| 6,445,815 B1 | 9/2002 | Sato |
| 2001/0010598 A1 | 8/2001 | Aritake et al. |
| 2010/0053164 A1 | 3/2010 | Imai et al. |
| 2011/0018903 A1 | 1/2011 | Lapstun et al. |
| 2012/0320088 A1 | 12/2012 | Ihara et al. |
| 2014/0049983 A1* | 2/2014 | Nichol ................. G02B 6/0018 362/610 |
| 2014/0146394 A1* | 5/2014 | Tout ....................... G09B 9/307 359/630 |
| 2014/0266990 A1 | 9/2014 | Makino et al. |
| 2014/0327667 A1 | 11/2014 | Kim et al. |
| 2015/0097858 A1 | 4/2015 | Miki et al. |
| 2015/0100179 A1 | 4/2015 | Alaniz et al. |
| 2015/0153575 A1* | 6/2015 | Komatsu ............ G02B 27/0172 345/8 |
| 2015/0219899 A1* | 8/2015 | Mack ................. G02B 27/0172 345/633 |
| 2015/0294505 A1 | 10/2015 | Atsmon |
| 2016/0116748 A1 | 4/2016 | Carollo et al. |

* cited by examiner

*Primary Examiner* — Dawayne A Pinkney
(74) *Attorney, Agent, or Firm* — Arc IP Law, PC; Joseph J. Mayo

(57) ABSTRACT

A display system for a head mounted device that provides a wide field-of-view image to the user. The system may use a pair of displays angled relative to one another, and a lens or lenses between the displays and the user's eyes to generate a wide field-of-view image. Lenses may be for example gradient index lenses, Fresnel lenses, or holographic optical elements in order to provide significant and complex bending of light across the field of view with relatively thin lenses. The system may provide lower resolution images at the periphery of the user's field of view, using for example light emitting elements at the periphery that are directed by the lens or lenses towards the outside edges of the field of view.

19 Claims, 9 Drawing Sheets

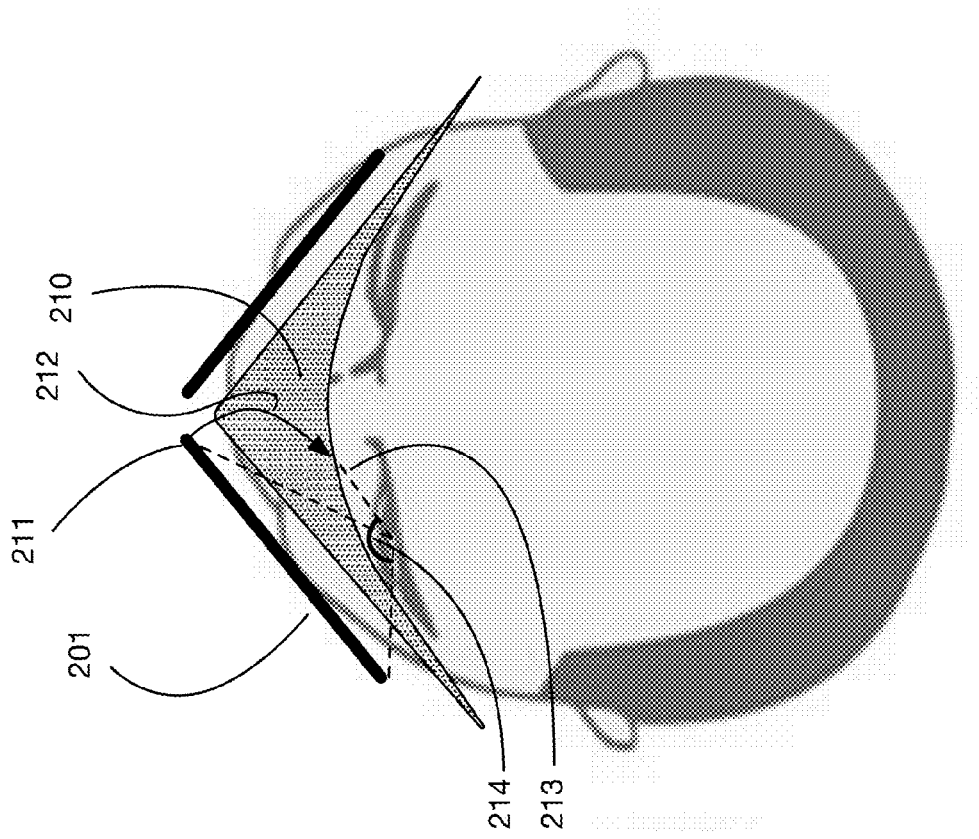
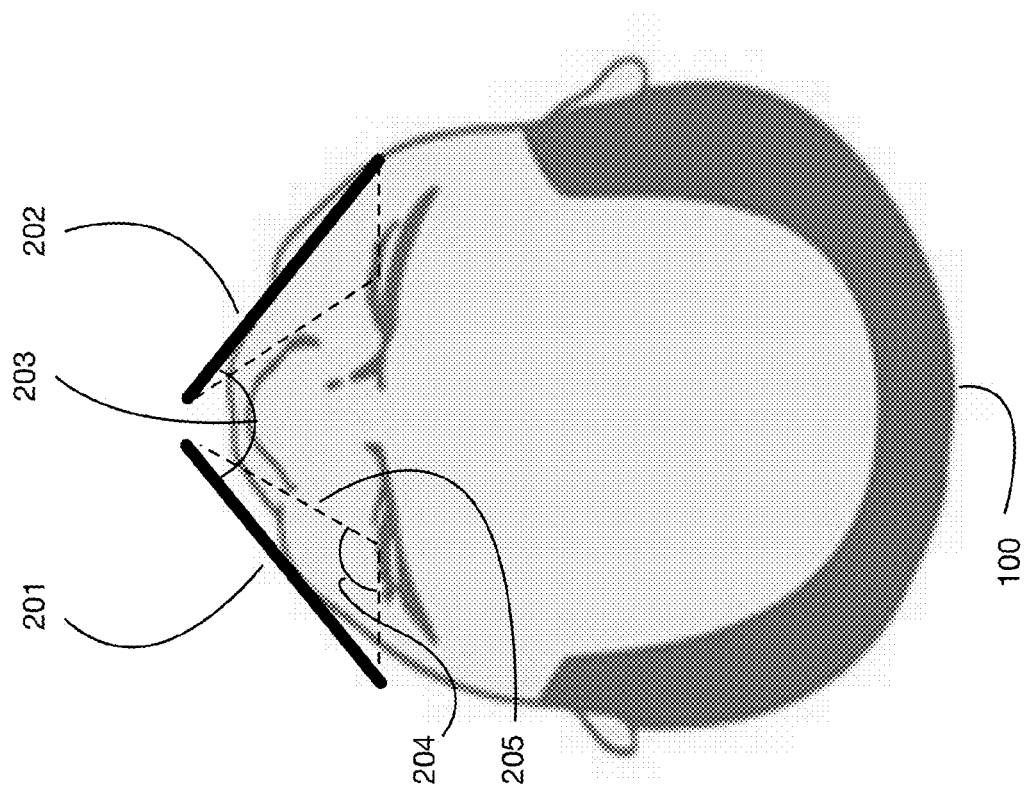
FIG. 2

WIDE FIELD-OF-VIEW HEAD MOUNTED DISPLAY SYSTEM

BACKGROUND OF THE INVENTION

1. Field of the Invention

One or more embodiments of the invention are related to the field of virtual reality systems. More particularly, but not by way of limitation, one or more embodiments of the invention enable a wide field-of-view head mounted display system that uses a pair of angled displays and a lens system to create an immersive image covering a significant portion of a user's natural field of view.

2. Description of the Related Art

Virtual reality systems are known in the art. Such systems generate a virtual world for a user that responds to the user's movements. Examples include various types of virtual reality headsets and goggles worn by a user, as well as specialized rooms with multiple displays. Virtual reality systems typically include sensors that track a user's head, eyes, or other body parts, and that modify the virtual world according to the user's movements. The virtual world consists of a three-dimensional model, computer-generated or captured from real-world scenes. Images of the three-dimensional model may be affected by the user's position and orientation, or by other factors such as the user's actions or parameters of the user's physical state. Generation of these images requires rendering of the three-dimensional model onto one or more two-dimensional displays that are integrated into a head mounted device.

A major challenge for existing virtual reality systems is that they have limited fields of view. These systems typically use head mounted devices with flat displays positioned in front of and parallel to the user's eyes. The field of view as seen by the user extends only to the edges of the display. The geometry and design of existing head mounted display devices provides a horizontal field typically on the order of 100 degrees. This field of view is far below the user's natural horizontal field of view, which is more than 180 degrees. Users therefore do not perceive the virtual reality environment as completely realistic.

For at least the limitations described above there is a need for a wide field-of-view head mounted display system.

BRIEF SUMMARY OF THE INVENTION

One or more embodiments described in the specification are related to a wide field-of-view head mounted display system. One or more embodiments of the system use a pair of angled displays and a lens system to create an immersive image covering a significant portion of a user's natural field of view. One or more embodiments use displays that are substantially flat; this configuration results in a wide field-of-view image using a compact display device that uses economical and readily available flat displays.

One or more embodiments of the system are incorporated into, attached to, or embedded in a mount that is configured to be worn on the head of a user or placed near the head of a user. This mount may include for example, without limitation, glasses, smart glasses, sunglasses, goggles, virtual reality goggles, a helmet, a visor, a hat, binoculars, a monocular, a telescope, or a microscope.

One or more embodiments include a left display and a right display, each located in front of the respective eye of the user. In one or more embodiments, the left display and right display may be substantially flat. Use of flat or substantially flat displays may provide cost and sourcing advantages since flat displays are readily available and can be manufactured at low cost. In one or more embodiments the left display and right display may be curved or formed from multiple sections angled with respect to one another; while curved displays may be more expensive in some cases, they may also simplify the geometry and optics of the system. Embodiments may use displays of any size or shape, along with one or more lenses to potentially increase the field of view.

In one or more embodiments, the left display and right display may be angled with respect to one another, rather than being parallel. For example, the angle between a plane tangent to the left display and a plane tangent to the right display may be less than 180 degrees, when measured from the side near the eyes of the user. This configuration may bring the left edge of the left display closer to the user's left eye, increasing the horizontal field of view perceived by the user. Similarly, this configuration may bring the right edge of the right display closer to the user's right eye, increasing the horizontal field of view perceived by the user.

One or more embodiments may include one or more lenses between the displays and the user's eyes. These lenses may for example form images of the displays that extends across a wider field of view than the displays themselves without the lenses. The lens or lenses may therefore increase the apparent field of view of the system. In one or more embodiments some or all of the pixels of the left and right displays may be substantially in focus when viewed through the lens or lenses. In one or more embodiment some or all of the pixels of the left and right displays may be out of focus to create diffuse images in certain portions of the field of view, for example at the periphery.

Embodiments of the system may use any type, number, and configuration of lenses. In one or more embodiments, one or more of the lenses may be a gradient index lens. A gradient index lens for example may provide significant curvature of the light rays from the displays with a relatively thin lens. In one or more embodiments, one or more of the lenses may be a Fresnel lens, which may also provide significant curvature of light rays with a relatively thin lens. One or more embodiments may use one or more holographic optical elements in conjunction with or in place of one or more lenses.

The image formed by the lens or lenses may be of any size and shape, and may extend across any vertical or horizontal field of view. In one or more embodiments the horizontal field of view of the image may for example exceed 120 degrees, 150 degrees, 180 degrees, or any other desired extent.

One or more embodiments of the system may use lower resolution at the periphery than in the central region of the user's field of view, to correspond to the variable resolution of the user's vision across the field of view. For example, one or more embodiments may include light emitting elements to the left of the left display, or to the right of the right display. These peripheral light emitting elements may for example be of lower resolution than the resolution of the left and right displays. In one or more embodiments the peripheral light emitting elements may have for example only vertical resolution and little or no horizontal resolution. In one or more embodiments the light from the peripheral light emitting elements may be directed by the lens or lenses towards the peripheries to form for example diffuse, low-resolution light in the peripheral portions of the user's field of view. In one or more embodiments the peripheral light emitters may be portions of the left and right displays, with pixels from these peripheral portions directed by the lens or lenses away from the focal points for the central regions of the left and right displays.

BRIEF DESCRIPTION OF THE DRAWINGS

The above and other aspects, features and advantages of the invention will be more apparent from the following more particular description thereof, presented in conjunction with the following drawings wherein:

FIG. 2 illustrates the geometry of an embodiment of the system that has flat left and right displays at an angle, and a lens between the displays and the users' eyes that enlarges the field of view.

DETAILED DESCRIPTION OF THE INVENTION

A wide field-of-view head mounted display system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
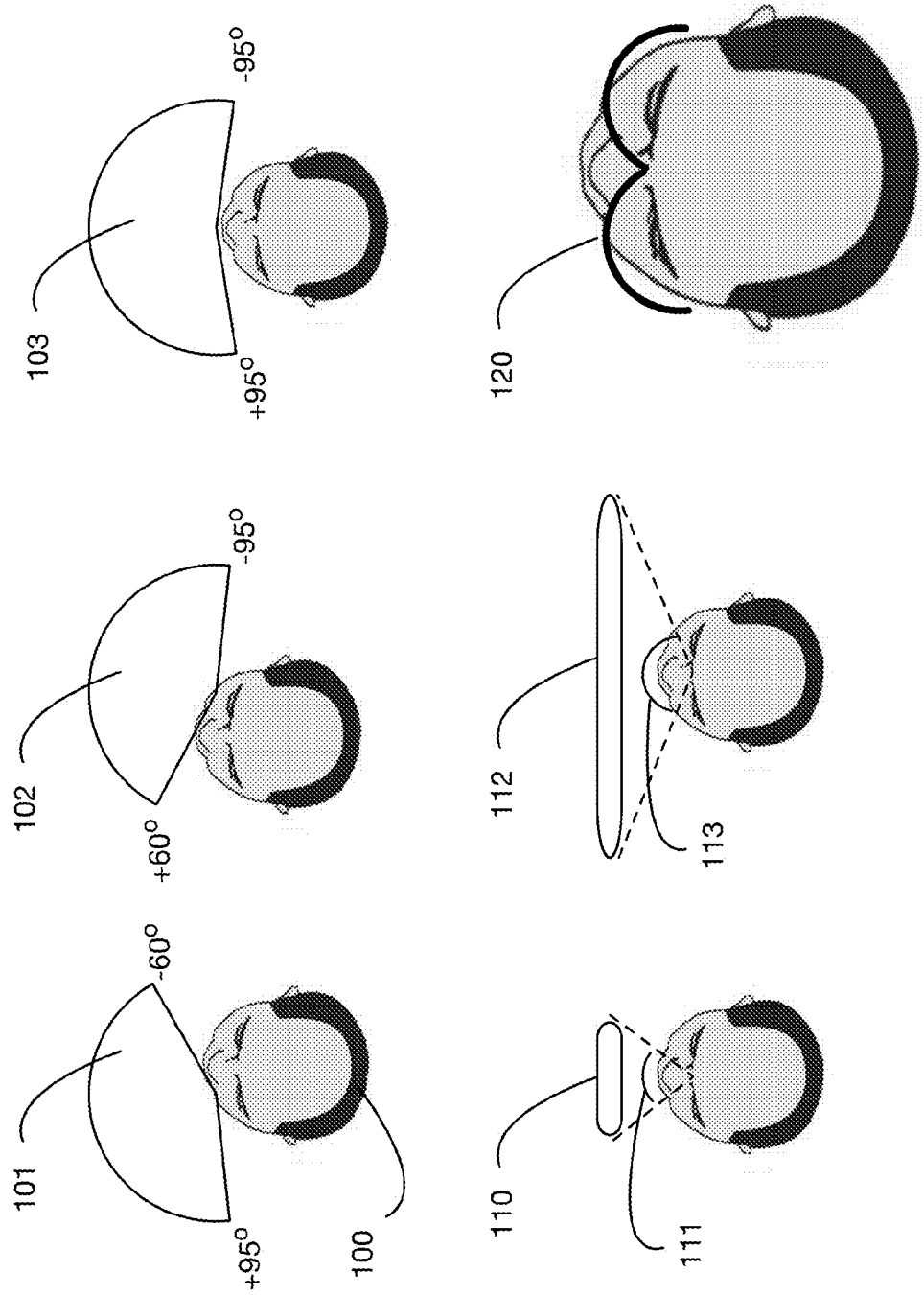
FIG. 1 illustrates the typical field of view of a user, and the challenge of creating a wide field-of-view display for a head mounted system.

FIG. 1 illustrates the challenge of providing a wide field-of-view display for a head mounted device. A typical user has a horizontal field of view 101 for the left eye and 102 for the right eye that each span approximately 155°. The combined field of view 103 for both eyes spans approximately 190°. In contrast, a typical head-mounted display like 110 has a small horizontal field of view 111. Thus a user with a typical head-mounted display like 110 does not have an immersive experience since much of the user's natural field of view is unused. FIG. 1 illustrates two potential approaches to enlarging the field of view of the display. One option is to use a much larger display 112, which increase the horizontal field of view to 113. This approach is undesirable because it results in displays that are bulky, heavy, and expensive. Another theoretical approach is to curve the display around each eye, as shown in 120. A disadvantage of this approach is that curved displays surrounding the entire field of view around an eye are not readily available and they may be expensive to manufacture.

FIG. 2 illustrates an approach used in one or more embodiments of the invention to increase the field of view of the display beyond that of a typical device 110 in FIG. 1. The display is separated into a left display 201 in front of the left eye of the user, and right display 202 in front of the right eye of the user. In the embodiment shown in FIG. 1 the left and right displays are flat or substantially flat, which may in some cases provide cost or sourcing advantages. In one or more embodiments the left or right display (or both) may be further segmented into multiple displays. In FIG. 2, the left edge of display 201 is angled towards the user 100, which brings this left edge further towards the leftward extreme of the user's field of view. Similarly the right edge of display 202 is angled towards the user, which brings the right edge further towards the rightward extreme of the user's field of view. The left display 201 and right display 202 are therefore not parallel; they are at an angle 203 that is less than 180°. The left eye field of view 204 that results from angling the display may be larger in some embodiments that the corresponding field of view for a narrow angle flat display like display 101 in FIG. 1. Embodiments may use left and right displays of any size and shape. In one or more embodiments the left and right displays may be curved for example, or formed from multiple sections lying on different planes, instead of flat as shown in the embodiment of FIG. 1. One or more embodiments may use flat displays for ease of manufacturing and sourcing. The angles 203 and 204 are only illustrative; one or more embodiments may use any angle between left and right displays, and may use any desired width and height for the left and right displays. For embodiments that use curved displays, the angle between displays may be considered for example to be the angle between planes that are tangent to each display at selected points on the displays.

One or more embodiments may further extend or alter the field of view for the display by using one or more lenses between the displays and the eyes of the user. This is illustrated in the right side of FIG. 2, with lens 210 between the displays and the user's eyes. One or more embodiments may use any number and configuration of lenses to bend, focus, or otherwise direct the light emitted or reflected from the displays. Lenses may be of any desired material and shape. One or more embodiments may use one or more adjustable lenses that may for example be focused or otherwise adjusted by a user. In FIG. 2, Lens 210 bends the light rays emitted from the displays 201 and 201 so that they appear to be coming from different directions. Thus the image of the display pixels viewed by the user may have a larger field of view than the displays themselves (without the lens or lenses). For example, light ray 212 from pixel 211 on left display 201 is bent by lens 210, so that the apparent direction 213 of this pixel is further to the right than the direction 205 of the pixel when viewed without the lens. Thus the horizontal field of view 214 of the image of the left display with the lens is greater than the field of view 204 without the lens. Similarly the field of view of the image of the right display with the lens is greater than the field of view without the lens. One or more embodiments may therefore use one or more lenses to enlarge the apparent field of view of the displays.

Figure 3:
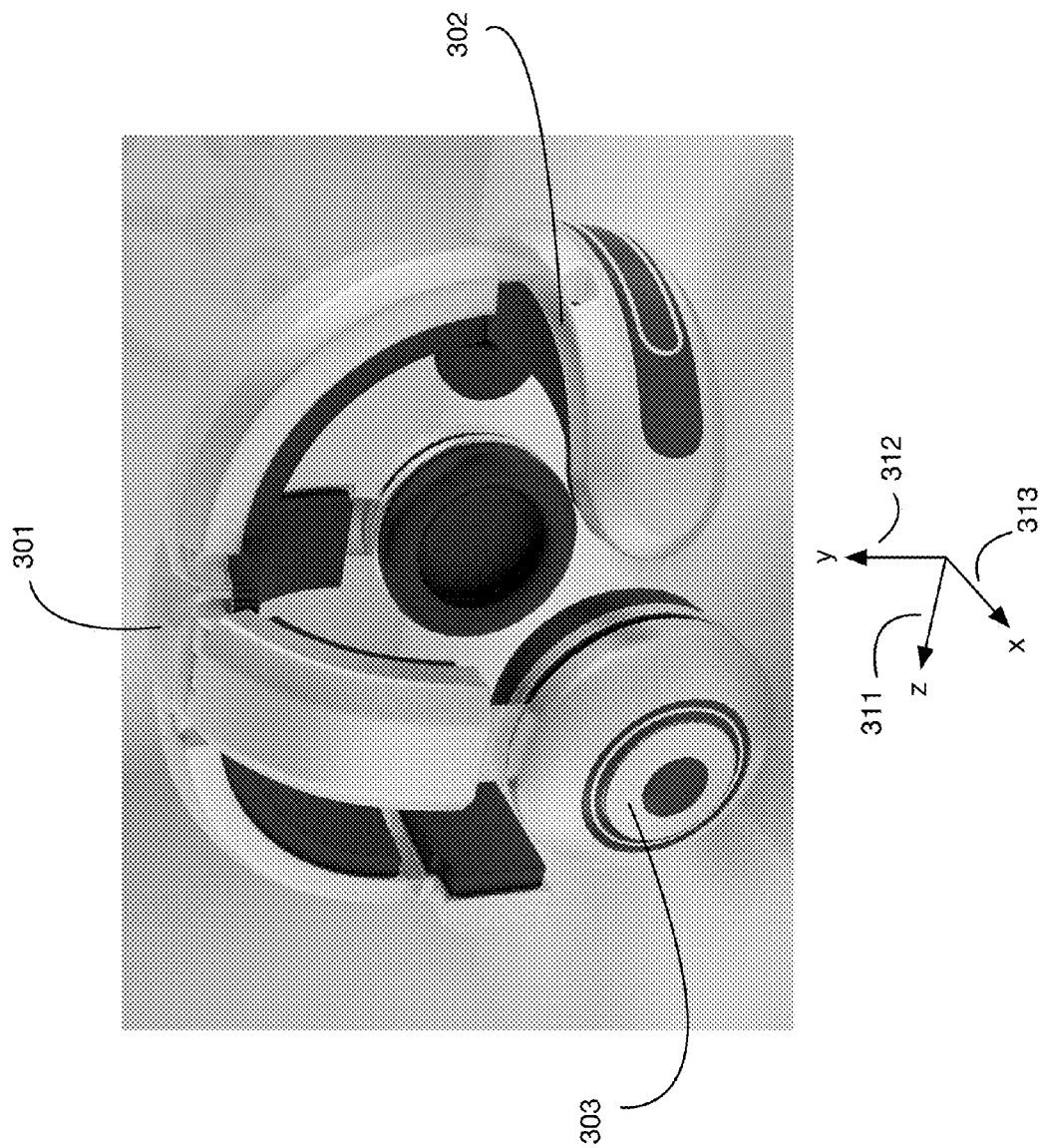
FIG. 3 illustrates an embodiment of head mounted system that incorporates a wide field-of-view display.

FIG. 3 illustrates an embodiment that incorporates a wide field of view display into mount 301. Axis 311 (z) of the figure as shown points backwards (into the user's eyes); axis 313 (x) points left-to-right, and axis 312 (y) points bottom-to-top. The front area 302 of the mount houses for example the left and right displays and the lens or lenses (for example as shown in FIG. 2). Speaker 303 may be used in one or more embodiments to provide audio in addition to video. The shape and components illustrated in FIG. 3 are illustrative only; embodiments may incorporate a wide field of view display system into any head mounted device of any size, shape, and configuration.

Figure 4:
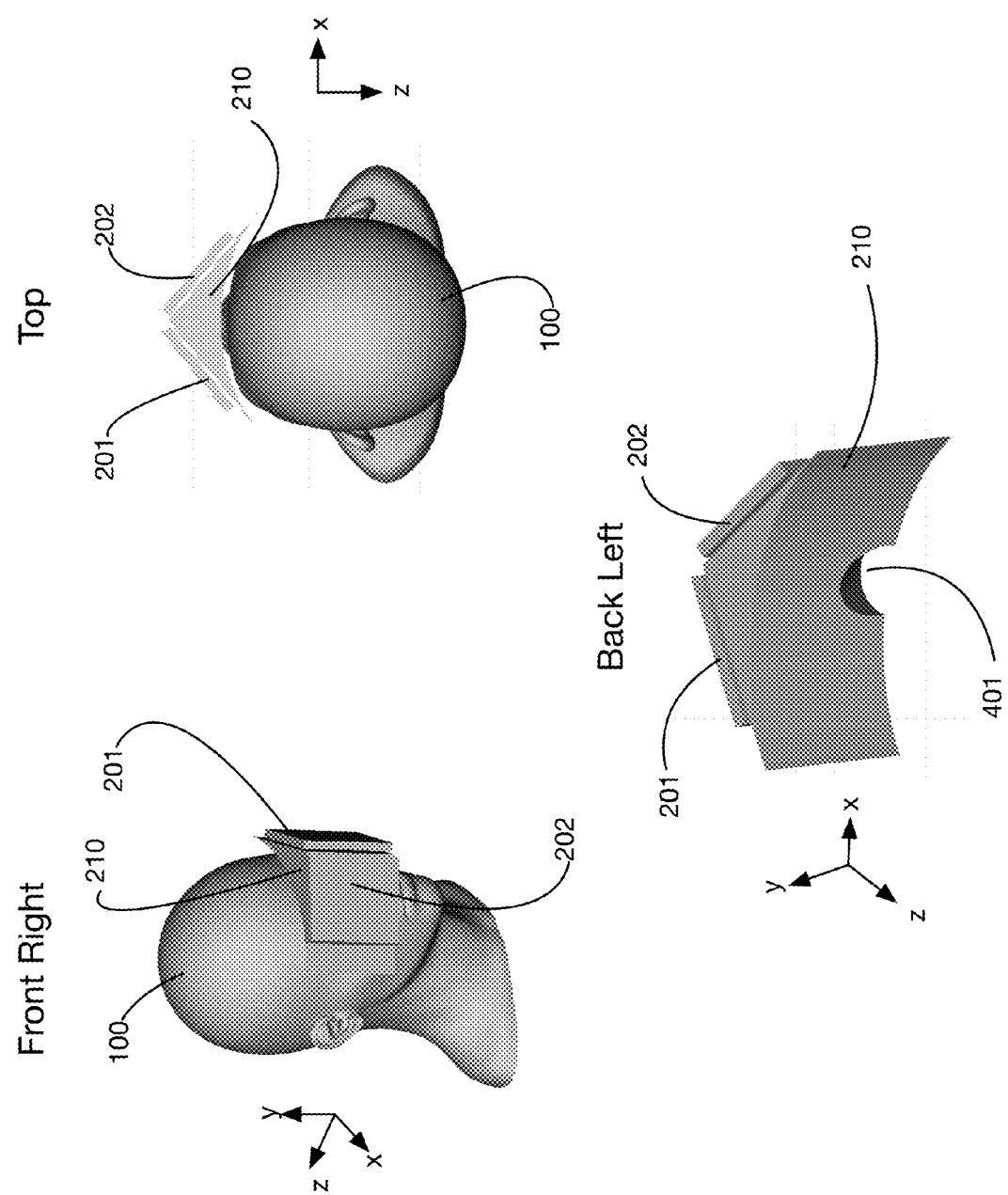
FIG. 4 shows a three dimensional model of the displays and lens for an embodiment of the system.

FIG. 4 illustrates several 3D views of an embodiment of the system from different orientations. Only the displays and lens are shown; other elements of a mount (such as for example the mount of FIG. 3) are not shown. The coordinate axes from FIG. 3 are shown for reference for each view. In the back left view, cutout 401 in the lens 210 is apparent; this cutout is for the user's nose. One or more embodiments may use lenses or displays of any shape or size. For example, lenses or displays may be configured to conform to any shape of a user, or of any device worn by or used by a user. As an example, one or more embodiments may be configured to be attached to any device worn by a user, such as for example, without limitation, glasses, sunglasses, goggles, helmets, visors, hats, contact lenses, or ocular implants.

Figure 5:
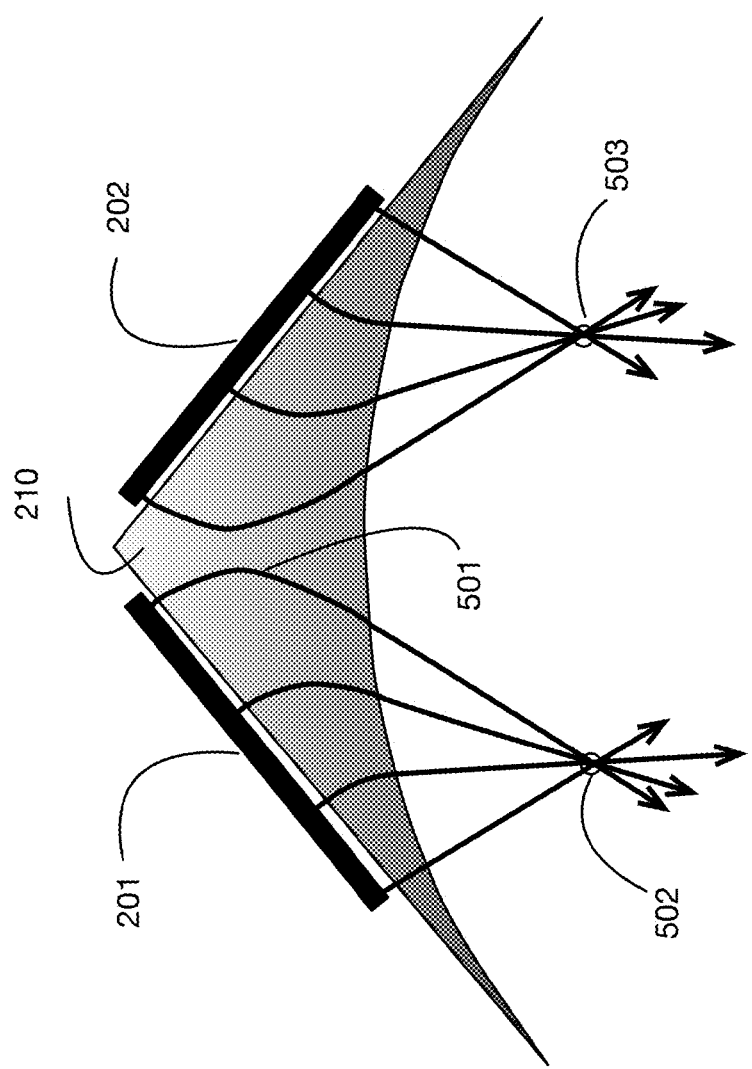
FIG. 5 shows a cross sectional view of the embodiment shown in FIG. 4, illustrating how the lens bends light rays emitted from the displays.

FIG. 5 shows a top view of an embodiment of the displays 201 and 202, and the lens 210. In this embodiment the lens is a gradient index lens, where the index of refraction of the lens changes continuously throughout the lens volume. One or more embodiments may use gradient index optics for one or more of the lenses of the system. An advantage of gradient index optics is that light rays can be bent significantly and in highly versatile ways using a relatively thin lens. For example, light can be focused in the middle area of a gradient index lens, but deflected outward at the edges of the lens to fill the user's peripheral field of vision. The gradient index lens entry and exit zones (layers) may also act as a collimator and optical relay to reduce the effect of non-parallel rays which would degrade the image. One or more embodiments may use Fresnel lenses. Fresnel lenses also provide the advantage of being relatively thin. Embodiments may use any type of lens or lenses between the displays and the user's eyes. One or more embodiments may use combinations of different types of lenses. One or more embodiments may use one or more holographic optical elements to diffract, reflect, or transmit light in any desired pattern. Holographic optical elements may be used for example in conjunction with other lenses, or in place of certain lenses.

In a simple lens consisting of uniform material, refraction of light rays occurs only at the lens surfaces. In a gradient index lens, such as the lens 210 in FIG. 5, refraction may occur throughout the lens due to continuous variations in the index of refraction of the lens material. For example, light ray 501 bends throughout the lens material 210, and not just at the boundaries of the lens. One or more embodiments may use any lens or combination of lenses to bend light in any desired manner, in order to form images of any shape and size. In the embodiment of FIG. 5, lens 210 focus the light rays from left display 201 onto point 502, which may for example be at or near the left eye of the user, and it focuses the light rays from right display 202 onto point 503, which may for example be at or near the right eye of the user.

Figure 6:
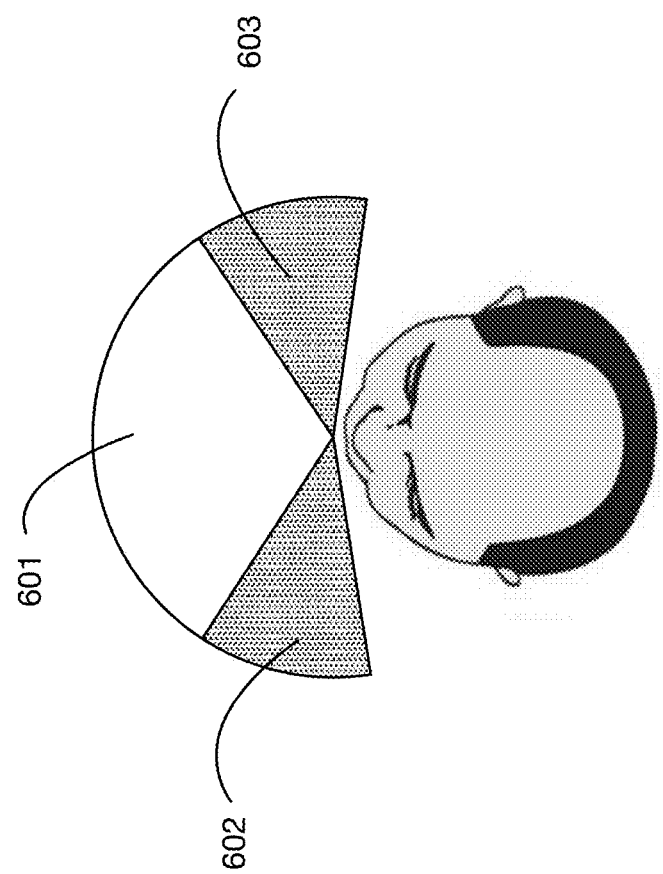
FIG. 6 illustrates the high resolution central field of view of a user, and the relatively low resolution peripheral field of view of the user.

One or more embodiments may optimize or otherwise configure the display and lens system to reflect the variable resolution of human vision in different portions of the field of view. FIG. 6 illustrates this variable resolution. Human vision has relatively high resolution in the central region 601 of the field of view, and relatively poor resolution in the peripheral regions 602 and 603. High resolution display or images in the peripheral regions of the field of view may therefore add little or nothing to the user's experience. However, for an immersive experience, it is preferable to provide some image across the user's entire field of view.

Figure 7:
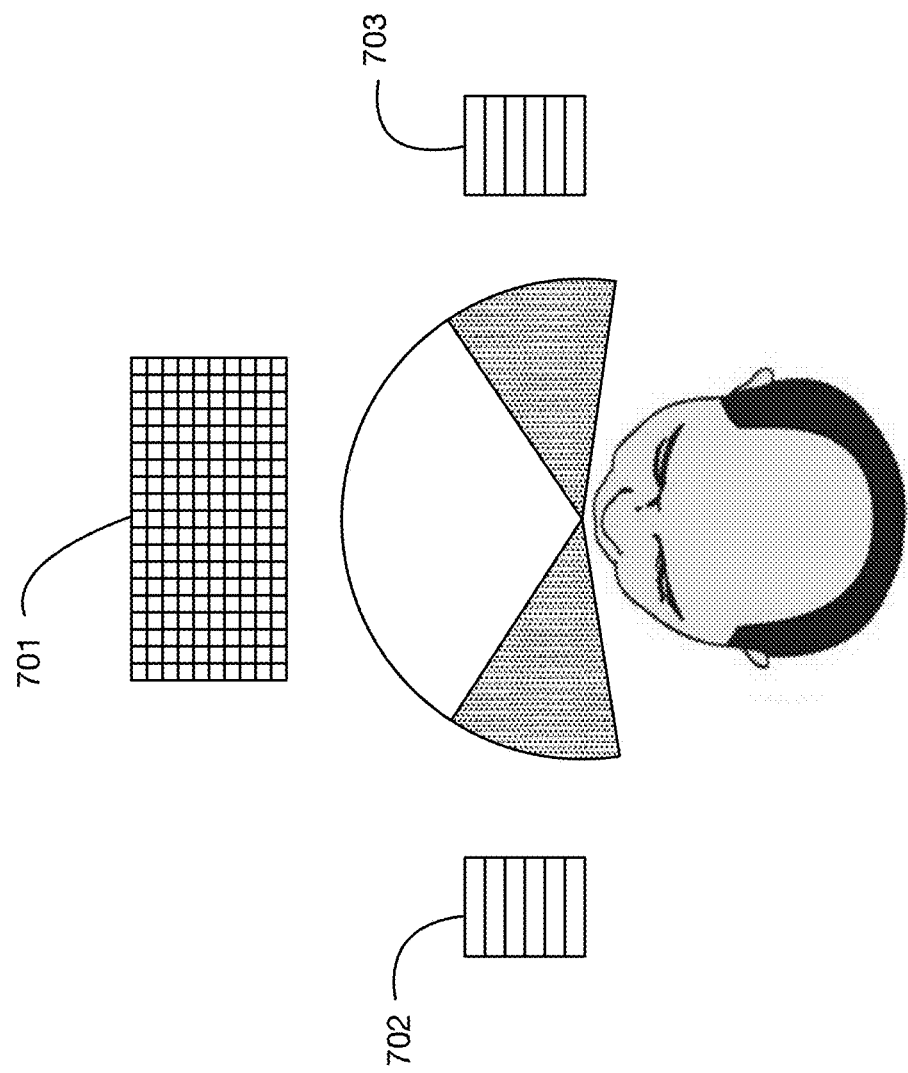
FIG. 7 illustrates an embodiment of the system that provides a high resolution display for the central portion of a user's field of view, and low resolution display for the peripheral portion of the user's field of view.

FIG. 7 illustrates a conceptual approach employed by one or more embodiments to optimize the display system to reflect the variable resolution across the field of view. In the central region of the field of view, a high resolution display 701 is provided. In the peripheral left and right regions of the field of view, low resolution displays 702 and 703 are provided. In the embodiment illustrated in FIG. 7, the peripheral displays have only vertical resolution and they are horizontally uniform. One or more embodiments may use peripheral displays with horizontal resolution as well as or instead of vertical resolution. Embodiments may use any desired density for central and peripheral displays. The technologies used to generate displays or images for the central region may be different from those used for the peripheral regions in one or more embodiments. For example, an embodiment may use a standard rectangular pixel display for the central region, and use LEDs or other light emitting devices at a low resolution for the peripheral regions. The light emitting devices for peripheral regions may for example project coarse or diffuse light towards the peripheral areas of the viewing device. The intensity and color of the diffuse light in the peripheral regions may be determined for example based on average luminance or color values in peripheral regions of the scene being displayed.

Figure 8:
FIG. 8 illustrates an image as viewed for example in an embodiment of the system as illustrated in FIG. 7.

FIG. 8 illustrates an image that may be produced by one or more embodiments that uses low resolution images in the peripheral regions. In this illustrative example, the central area 701 of the image has significant vertical and horizontal resolution. The left and right peripheral regions of the image 702 and 703 in this example have no horizontal resolution, and relatively low vertical resolution.

Figure 9:
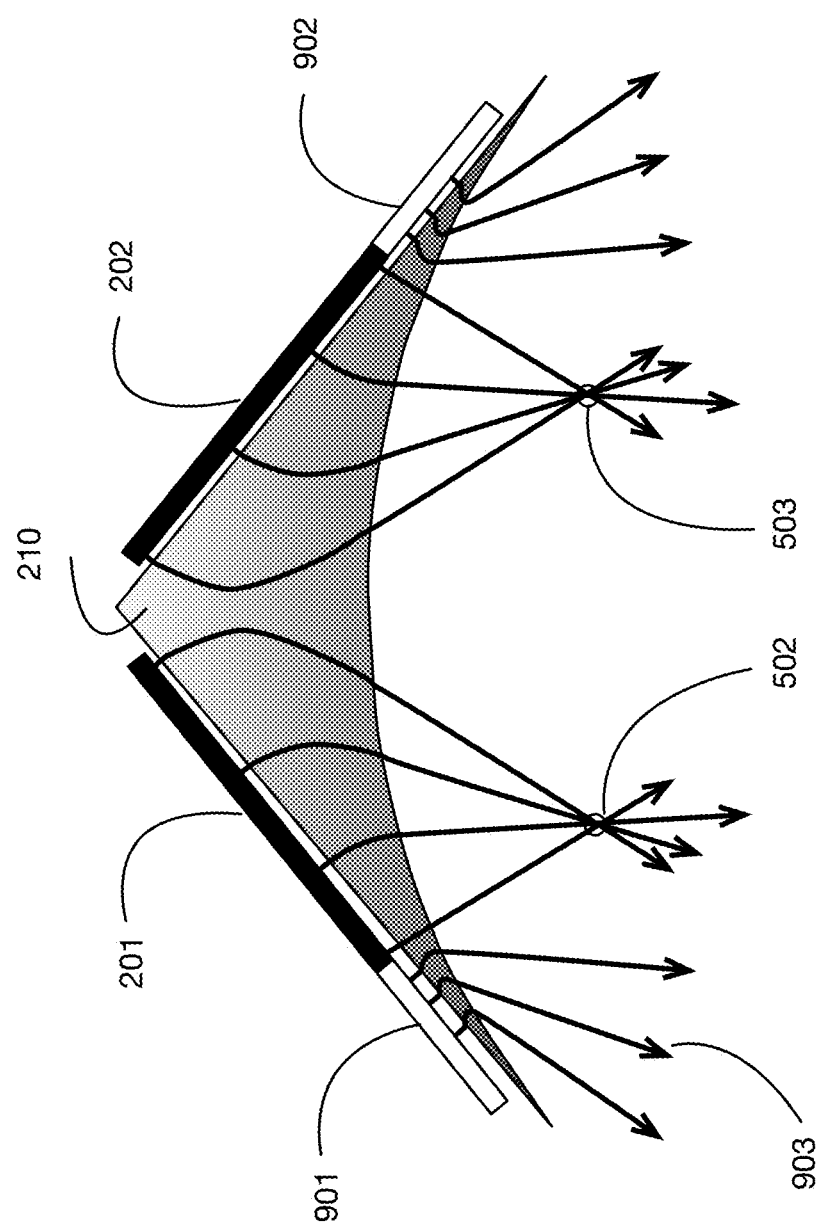
FIG. 9 illustrates an embodiment of the system that provides potentially lower resolution diffuse light for the peripheral vision regions of the user's field of view, using a lens to project unfocussed light towards the periphery.

One or more embodiments may use a lens or combination of lenses to direct the peripheral light or peripheral images towards the edges of the viewing device. FIG. 9 illustrates an embodiment that extends the example shown in FIG. 5 to generate unfocused images in the periphery of the user's field of view. This embodiment has a left peripheral display region 901 to the left of display 201, and a right peripheral display region 902 to the right of display 202. In one or more embodiments a peripheral display region may be part of an integrated display that includes for example both 201 and 901. In one or more embodiments the peripheral display regions may instead be separate devices, such as for example lower resolution displays or arrays of individual light emitting devices. The lens 210, which may for example be a gradient index lens, bends the light from the peripheral display regions outward towards the edges of the viewing device. These light rays may for example not converge at the focal points 502 and 503. For example, light ray 903 from left peripheral display region 901 is bent outward by lens 210 and it does not converge on focal point 502. The user may therefore view the images from regions 901 and 902 as diffuse, unfocused light rather than as focused high resolution pixels.

While the invention herein disclosed has been described by means of specific embodiments and applications thereof, numerous modifications and variations could be made thereto by those skilled in the art without departing from the scope of the invention set forth in the claims.

What is claimed is:

1. A wide field-of-view head-mounted display system comprising
a mount configured to be worn on a head of a user;
a left display coupled to said mount and located in front of a left eye of said user, wherein said left display is tangent to a left plane;
a right display coupled to said mount and located in front of a right eye of a user, wherein said right display is tangent to a right plane;
one or more lenses coupled to said mount and located between the left and right eyes of said user and the left and right displays; and,
wherein
an angle between said left plane and said right plane is less than 180 degrees, when measured from a side closest to the left and right eyes of said user;
said left display forms a left image by said one or more lenses that is substantially in focus for said left eye of said user;
said right display forms a right image by said one or more lenses that is substantially in focus for said right eye of said user;
said left image of said left display viewed by said left eye of said user extends across a wider horizontal field of view than said left display viewed by said left eye of said user without said one or more lenses; and,
said right image of said right display viewed by said right eye of said user extends across a wider horizontal field of view than said right display viewed by said right eye of said user without said one or more lenses;
a left peripheral light emitter located on a left side of said left display; and,
a right peripheral light emitter located on a right side of said right display;
wherein said left peripheral light emitter and said right peripheral light emitter comprise a lower resolution than a resolution of said left display and said right display;
wherein
light from said left peripheral light emitter is projected left of the left image of said left display, and,
light from said right peripheral light emitter is projected right of the right image of said right display;
wherein said light from said left peripheral light emitter and said light from said right peripheral light emitter are directed by said one or more lenses towards peripheries of said left display and right display to form diffuse low-resolution light in peripheral portions of said user's field of view;
wherein said left peripheral light emitter and said right peripheral light emitter each comprise a plurality of peripheral light pixels located at different vertical positions; and,
wherein said plurality of pixels of each of said left peripheral light emitter and said right peripheral light emitter in said peripheral portions of said user's field of view are directed by said one or more lenses away from focal points of central regions of each of said left display and said right display, such that said light from said left peripheral light emitter and said light from said right peripheral light emitter are bent outward by said one or more lenses and do not converge on said focal points of said central regions.

2. The system of claim 1 wherein
said left display is substantially flat; and,
said right display is substantially flat.

3. The system of claim 1 wherein at least one of said one or more lenses comprise a gradient index lens.

4. The system of claim 1 wherein at least one of said one or more lenses comprise a Fresnel lens or a holographic optical element.

5. The system of claim 1 wherein a combined horizontal field of view of said image of said left display and said image of said right display is at least 120 degrees.

6. The system of claim 1 wherein a combined horizontal field of view of said image of said left display and said image of said right display is at least 150 degrees.

7. The system of claim 1 wherein a combined horizontal field of view of said image of said left display and said image of said right display is at least 180 degrees.

8. The system of claim 1, wherein
said left peripheral light emitter is located between said one or more lenses and said left eye of said user;
said right peripheral light emitter is located between said one or more lenses and said right eye of said user;
said one or more lenses bend light from said left peripheral light emitter left; and,
said one or more lenses bend light from said right peripheral light emitter right.

9. The system of claim 8, wherein
said left peripheral light emitter comprises a left region of said left display; and,
said right peripheral light emitter comprises a right region of said right display.

10. The system of claim 1, wherein said left peripheral light emitter and said right peripheral light emitter comprises vertical resolution and no horizontal resolution.

11. A wide field-of-view head-mounted display system comprising
a mount configured to be worn on a head of a user;
a left display coupled to said mount and located in front of a left eye of said user, wherein said left display is tangent to a left plane;
a right display coupled to said mount and located in front of a right eye of a user, wherein said right display is tangent to a right plane;
one or more lenses coupled to said mount and located between the left and right eyes of said user and the left and right displays;
wherein
an angle between said left plane and said right plane is less than 180 degrees, when measured from a side closest to the left and right eyes of said user;
said left display forms a left image by said one or more lenses that is substantially in focus for said left eye of said user;
said right display forms a right image by said one or more lenses that is substantially in focus for said right eye of said user;
said left image of said left display viewed by said left eye of said user extends across a wider horizontal field of view than said left display viewed by said left eye of said user without said one or more lenses; and,
said right image of said right display viewed by said right eye of said user extends across a wider horizontal field of view than said right display viewed by said right eye of said user without said one or more lenses;
wherein a combined horizontal field of view of said image of said left display and said image of said right display is at least 120 degrees;

a left peripheral light emitter located on a left side of said left display;

a right peripheral light emitter located on a right side of said right display;

wherein said left peripheral light emitter and said right peripheral light emitter comprise a lower resolution than a resolution of said left display and said right display;

wherein said left peripheral light emitter and said right peripheral light emitter comprises vertical resolution and no horizontal resolution;

wherein light from said left peripheral light emitter is projected left of the left image of said left display;

wherein light from said right peripheral light emitter is projected right of the right image of said right display;

wherein said light from said left peripheral light emitter and said light from said right peripheral light emitter are directed by said one or more lenses towards peripheries of said left display and right display to form diffuse low-resolution light in peripheral portions of said user's field of view;

wherein said left peripheral light emitter and said right peripheral light emitter each comprise a plurality of peripheral light pixels located at different vertical positions;

wherein said plurality of pixels of each of said left peripheral light emitter and said right peripheral light emitter in said peripheral portions of said user's field of view are directed by said one or more lenses away from focal points of central regions of each of said left display and said right display, such that said light from said left peripheral light emitter and said light from said right peripheral light emitter are bent outward by said one or more lenses and do not converge on said focal points of said central regions.

12. The system of claim 11 wherein
said left display is substantially flat; and,
said right display is substantially flat.

13. The system of claim 11 wherein at least one of said one or more lenses comprise a gradient index lens.

14. The system of claim 11 wherein at least one of said one or more lenses comprise a Fresnel lens or a holographic optical element.

15. The system of claim 11 wherein the combined horizontal field of view of said image of said left display and said image of said right display is at least 150 degrees.

16. The system of claim 11 wherein the combined horizontal field of view of said image of said left display and said image of said right display is at least 180 degrees.

17. The system of claim 11, wherein
said left peripheral light emitter is located between said one or more lenses and said left eye of said user;
said right peripheral light emitter is located between said one or more lenses and said right eye of said user;
said one or more lenses bend the light from said left peripheral light emitter to the left; and,
said one or more lenses bend the light from said right peripheral light emitter to the right.

18. The system of claim 11, wherein
said left peripheral light emitter comprises a left region of said left display; and,
said right peripheral light emitter comprises a right region of said right display.

19. The system of claim 11, wherein said left peripheral light emitter and said right peripheral light emitter comprises vertical resolution and no horizontal resolution.

\* \* \* \* \*